(12) United States Patent
Liou et al.

(10) Patent No.: US 8,427,676 B2
(45) Date of Patent: Apr. 23, 2013

(54) IMAGE TRANSMITTING DEVICE

(75) Inventors: Yao-Ming Liou, Taipei (TW);
Hung-Chan Chien, Taipei (TW);
Kuan-Chih Huang, Taipei County (TW)

(73) Assignee: HiTi Digital, Inc., Taipei (TW)

( * ) Notice: Subject to any disclaimer, the term of this patent is extended or adjusted under 35 U.S.C. 154(b) by 663 days.

(21) Appl. No.: 12/423,821

(22) Filed: Apr. 15, 2009

(65) Prior Publication Data
US 2010/0265533 A1     Oct. 21, 2010

(51) Int. Cl.
*G06F 3/12* (2006.01)
(52) U.S. Cl.
USPC ............. 358/1.15; 358/1.13; 710/8; 710/305; 710/306; 710/313
(58) Field of Classification Search .................. 358/1.13, 358/1.15, 1.16; 710/7, 8, 11, 20, 28, 305, 710/306, 313
See application file for complete search history.

(56) References Cited

U.S. PATENT DOCUMENTS

| | | | |
|---|---|---|---|
| 6,806,976 B1 * | 10/2004 | Suyehira | 358/1.14 |
| 6,813,025 B2 * | 11/2004 | Edwards | 356/422 |
| 6,943,909 B2 | 9/2005 | Goldstein et al. | |
| 7,394,966 B1 | 7/2008 | Wada et al. | |
| 7,570,391 B2 * | 8/2009 | Hayaishi | 358/1.9 |
| 2003/0233507 A1 * | 12/2003 | Yu et al. | 710/310 |
| 2005/0237568 A1 * | 10/2005 | Yun | 358/1.15 |
| 2005/0286075 A1 * | 12/2005 | Ryu et al. | 358/1.15 |
| 2007/0162949 A1 * | 7/2007 | Nitta et al. | 725/134 |
| 2008/0084587 A1 * | 4/2008 | Noguchi | 358/451 |

FOREIGN PATENT DOCUMENTS

| | | |
|---|---|---|
| JP | 2004222329 A | 8/2004 |
| JP | 200564788 A | 3/2005 |
| JP | 200725754 A | 2/2007 |

* cited by examiner

*Primary Examiner* — Vu B Hang
(74) *Attorney, Agent, or Firm* — Winston Hsu; Scott Margo

(57) ABSTRACT

An image transmitting device for transmitting an image from an image source device to an image output device includes a second USB interface, an image receiver, a first memory, a wireless transmitter, a processor, and a switch. The image source device includes a first USB interface, and the image output device includes a wireless receiver. The second USB interface is connected to the first USB interface by a cable. The image receiver is used for receiving the image from the image source device. The first memory is used for storing the image received by the image receiver. The wireless transmitter is used for communicating with the wireless receiver and for transmitting the image from the first memory to the image output device. The switch is used for switching on or off the power voltage of the second USB interface and for driving the processor to switch on or off the image receiver.

7 Claims, 5 Drawing Sheets

IMAGE TRANSMITTING DEVICE

BACKGROUND OF THE INVENTION

1. Field of the Invention

The invention relates to an image transmitting device and a method utilizing the image transmitting device to transmit image and, more particularly, to an image transmitting device which allows an image source device to capture images while the image source device is being connected to the image transmitting device by a universal serial bus (USB) cable.

2. Description of the Prior Art

Currently in real time embedded applications, it is impossible for users to print directly from their mobile camera to printer. However, the proposed PictBridge protocol defines a set of protocols and operations that enable an image source device to create and send a print job to an image output device. The proposed protocol supports for printing a single image or a collection of images and for providing the user with ongoing status results. The proposed PictBridge protocol makes it possible for any digital camera and printer to be combined, regardless of manufacturer or model, as long as they both support the PictBridge standard.

In order to print image data, a user is required to connect the digital camera and printer with a USB cable. If a USB cable is used for such connection, the distance between the digital camera and printer is limited by the length of the USB cable. If the cable is short, the digital camera and printer are required to be set near to each other. Furthermore, once the digital camera is connected to the printer by a USB cable, it will enter an operation mode immediately by PictBridge protocol and cannot be used to capture images under the operation mode. After transmitting image data from the digital camera to the printer, the user is required to disconnect the digital camera from the printer so as to operate the digital camera to capture images again. The user operations therefore become complicated.

SUMMARY OF THE INVENTION

An objective of the invention is to provide an image transmitting device and method for transmitting an image from an image source device to an image output device so as to solve the aforesaid problems.

According to an embodiment, the image transmitting device of the invention comprises a second USB interface, an image receiver, a first memory, a wireless transmitter, a processor, and a switch. Furthermore, the image source device comprises a first USB interface, and the image output device comprises a wireless receiver.

The second USB interface of the image transmitting device is connected to the first USB interface of the image source device by a cable. The image receiver is connected to the second USB interface and used for receiving the image from the image source device via the first and second USB interfaces. The first memory is used for storing the image received by the image receiver. The wireless transmitter is used for communicating with the wireless receiver and for transmitting the image from the first memory to the image output device via the wireless receiver. The processor is connected to the image receiver, the memory, and the wireless transmitter and used for controlling operations of the image receiver, the memory, and the wireless transmitter. The switch is connected between the second USB interface and the processor and used for switching on or off power voltage of the second USB interface to enable or disable PictBridge communication between the image transmitting device and the image source device and for driving the processor to switch on or off the image receiver.

According to another embodiment, the method for transmitting an image from an image source device to an image output device comprises the steps of: (1) connecting a first USB interface of the image source device and a second USB interface of an image transmitting device by a cable, wherein the image transmitting device comprises a switch for switching on or off power voltage of the second USB interface; (2) operating the switch to switch on the power voltage of the second USB interface; (3) the image source device sensing the second USB interface is powered on and enter a PictBridge operation mode; (4) transmitting the image from the image source device to the image transmitting device via the first and second USB interfaces; and (5) transmitting the image from the image transmitting device to the image output device in wireless manner.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
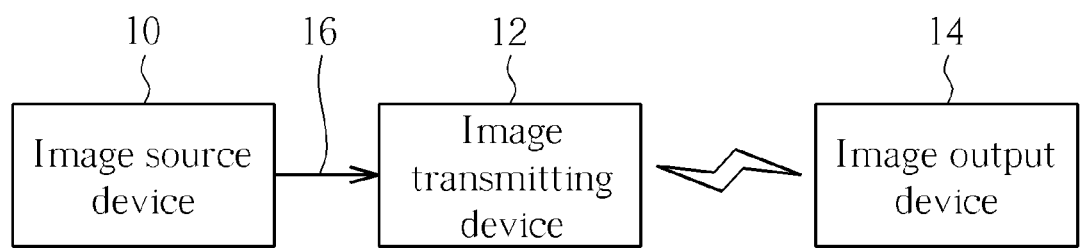
FIG. 1 is a functional block diagram illustrating an image transmitting device for transmitting an image from an image source device to an image output device according to an embodiment of the invention.

Referring to FIG. 1, FIG. 1 is a functional block diagram illustrating an image transmitting device 12 for transmitting an image from an image source device 10 to an image output device 14 according to an embodiment of the invention. As shown in FIG. 1, the image transmitting device 12 is detachably connected to the image source device by a cable 16, such as a USB cable. Furthermore, the image transmitting device 12 can communicate with the image output device in wireless manner. In this embodiment, the image source device 10 can be, but not limited to, a digital still camera (DSC) and the image output device 14 can be, but not limited to, a printer.

Figure 2:
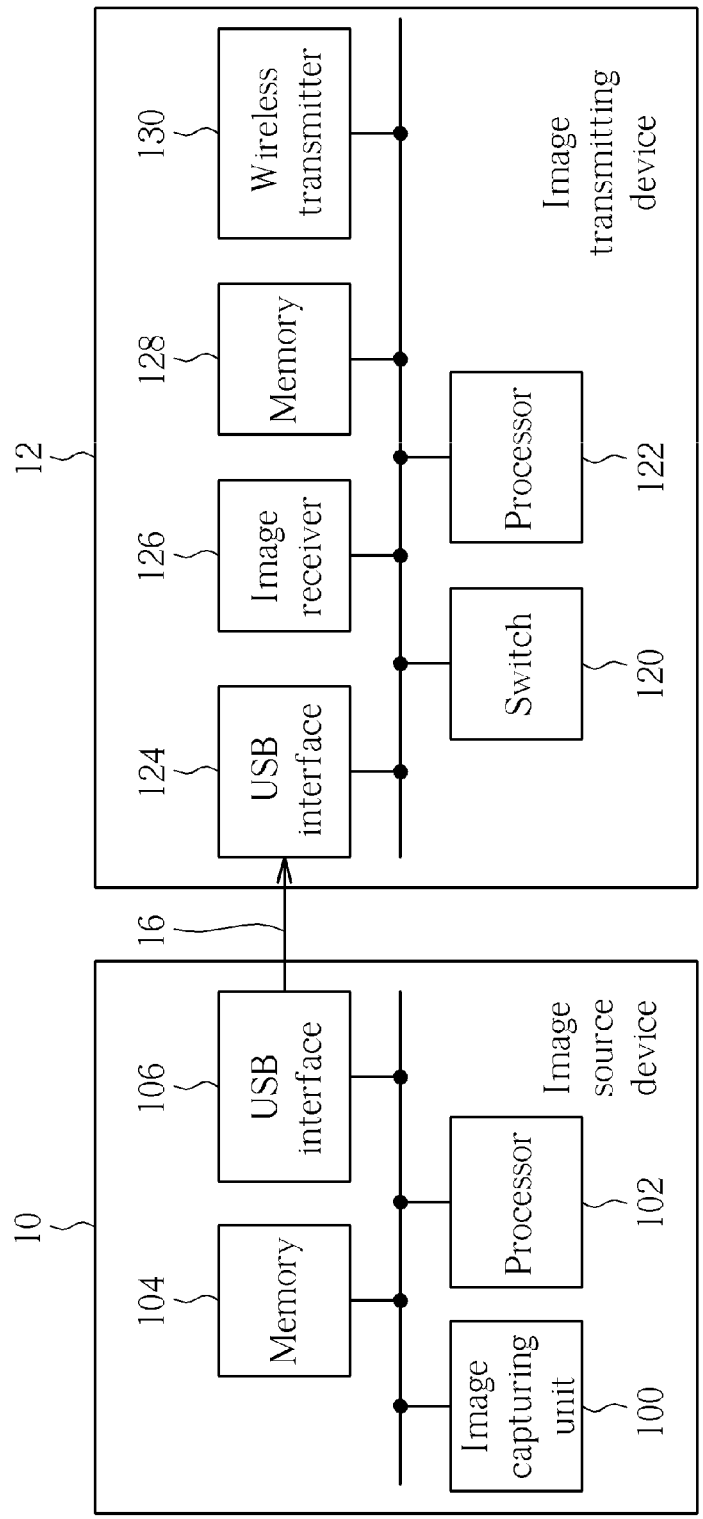
FIG. 2 is functional block diagram illustrating the image source device and the image transmitting device shown in FIG. 1.

Referring to FIG. 2, FIG. 2 is functional block diagram illustrating the image source device 10 and the image transmitting device 12 shown in FIG. 1. As shown in FIG. 2, the image source device 10 comprises an image capturing unit 100, a processor 102, a memory 104, and a USB interface 106. The processor 102 is electrically connected to the image capturing unit 100, the memory 104, and the USB interface 106 so as to control operations of these components. The capturing unit 100 can be used to capture images and the captured images can be stored in the memory 104. It should be noted that the image source device 10 may further comprise other components, such as lens, display and so on, for the purpose of capturing images according to practical applications.

Furthermore, the image transmitting device 12 comprises a switch 120, a processor 122, a USB interface 124, an image receiver 126, a memory 128, and a wireless transmitter 130. The processor 122 is electrically connected to the switch 120, the USB interface 124, the image receiver 126, the memory 128, and the wireless transmitter 130 so as to control operations of these components. The switch 120 is used for switching on or off power voltage of the USB interface 124 to enable or disable PictBridge communication between the image transmitting device 12 and the image source device 10 and for driving the processor 122 to switch on or off the image receiver 126.

The USB interface 124 of the image transmitting device 12 can be connected to the USB interface 106 of the image source device 10 by the cable 16. In this embodiment, the cable 16 is a USB cable, so the USB interfaces 106, 124 comply with USB protocol. When the image source device 10 is connected to the image transmitting device 12 with the cable 16, the power voltage of the USB interface 124 is off before actuating the switch 120. Therefore, a user still can use the image source device 10 to capture images even though the image source device 10 is connected to the image transmitting device 12 with the cable 16.

When the user wants to print the images captured by the image source device 10 immediately, he or she just needs to depress the switch 120 so as to switch on the power voltage of the USB interface 124 and drive the processor 122 to switch on the image receiver 126. Afterward, the image source device 10 senses the USB interface 106 is powered on and then can communicate with the USB interface 124 of the image transmitting device 12 by PictBridge protocol. In this embodiment, the image receiver 126 complies with PictBridge protocol, so it can receive the image from the image source device 10 via the USB interfaces 106, 124 under PictBridge protocol. That is to say, when the user depresses the switch 120, the photo mode performed on the image source device 10 will be converted into PictBridge mode. In practical applications, the user may manually operate PictBridge mode to send a single image or a collection of images to the image transmitting device 12. It should be noted that when the switch 120 is operated to switch on the power voltage of the USB interface 124 and drive the processor 122 to switch on the image receiver 126, the image source device 10 is incapable of capturing images.

After receiving the wanted image from the image source device 10 and storing the image into the memory 128, the user has to depress the switch 120 again or, alternatively, the power voltage of the USB interface 124 will be switched off automatically. After sensing that the USB interface 106 is powered off, the image source device 10 converts PictBridge mode into photo mode. Then, the user can use the image source device 10, which is still connected to the image transmitting device 12, to capture images again. That is to say, when the switch 120 is operated to switch off the power voltage of the USB interface 124 or, alternatively, the power voltage of the USB interface 124 is switched off automatically after receiving the wanted image from the image source device 10, the image source device 10 is capable of capturing images.

Figure 3:
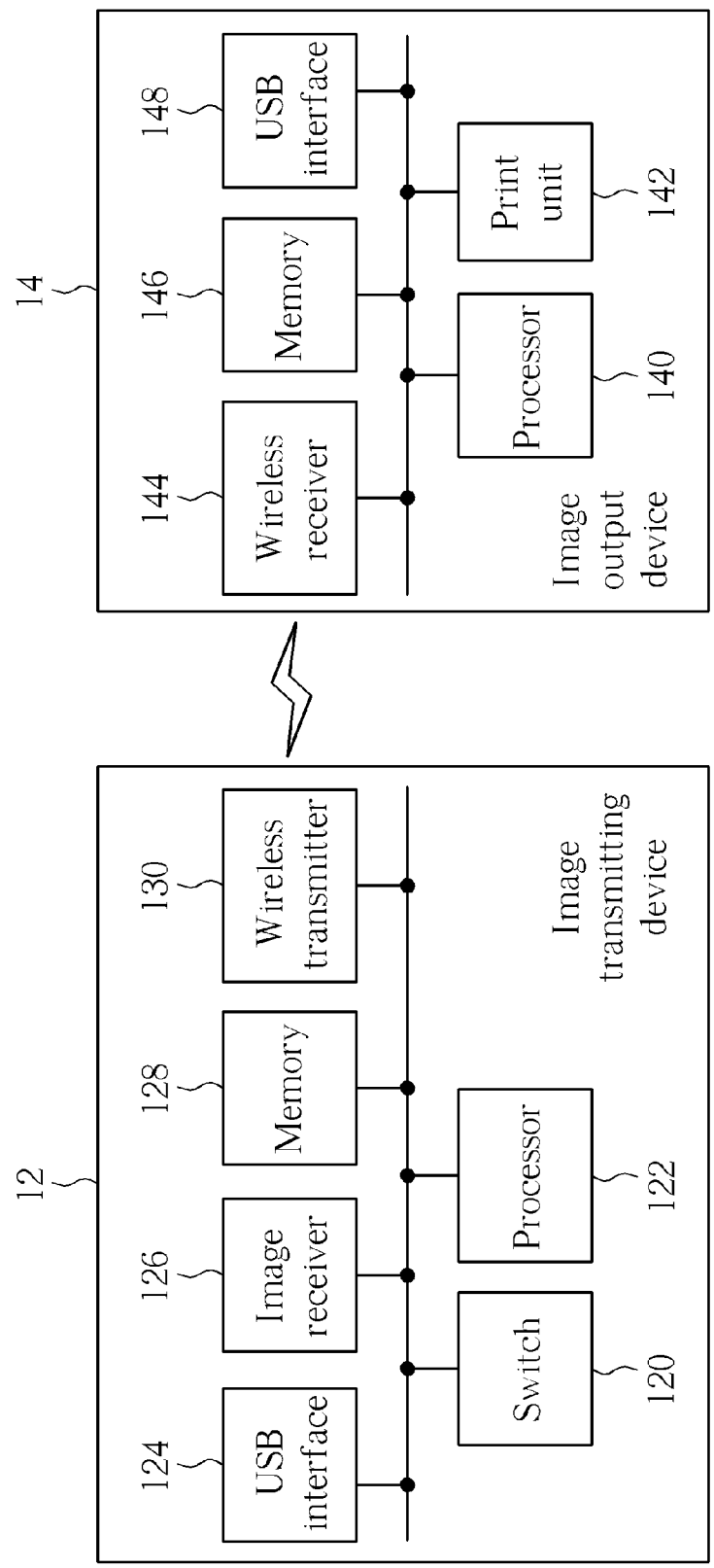
FIG. 3 is a functional block diagram illustrating the image transmitting device and the image output device shown in FIG. 1.

Referring to FIG. 3, FIG. 3 is a functional block diagram illustrating the image transmitting device 12 and the image output device 14 shown in FIG. 1. As shown in FIG. 3, the image output device 14 comprises a processor 140, a print unit 142, a wireless receiver 144, a memory 146, and a USB interface 148. The processor 140 is electrically connected to the print unit 142, the wireless receiver 144, the memory 146, and the USB interface 148 so as to control operations of these components. It should be noted that the image output device 14 may further comprise other components, such as ink cartridge and so on, for the purpose of printing images according to practical applications. The wireless transmitter 130 of the image transmitting device 12 can communicate with the wireless receiver 144 of the image output device 14 in wireless manner. For example, the wireless receiver 144 and the wireless transmitter 130 comply with, but not limited to, WiFi protocol.

In this embodiment, after the image transmitting device 12 receives the image from the image source device 10, the wireless transmitter 130 can transmit the image stored in the memory to the image output device 14 via the wireless receiver 144. Afterward, the image may be stored in the memory 146 or be printed by the print unit 142.

Moreover, a set of wireless setting information can be stored in the memory 146 of the image output device 14. The set of wireless setting information is used for establishing communication between the wireless transmitter 130 of the image transmitting device 12 and the wireless receiver 144 of the image output device 14. In this embodiment, the user can utilizes the aforesaid cable 16 to connect the USB interface 124 of the image transmitting device 12 and the USB interface 148 of the image output device 14. It should be noted that the USB interface 148 also complies with USB protocol since the cable 16 is a USB cable. When the USB interface 124 is connected to the USB interface 148 by the cable 16, the set of wireless setting information is capable of being transmitted from the memory 146 of the image output device 14 to the memory 128 of the image transmitting device 12 via the USB interfaces 124, 148. For example, when the USB interface 124 is connected to the USB interface 148 by the cable 16, the set of wireless setting information can be automatically transmitted from the image output device 14 to the image transmitting device 12 and then the setting procedure can be automatically performed. That is to say, the user does not need to remember the set of wireless setting information and setting procedure, and the user operations therefore become easy.

Figure 4:
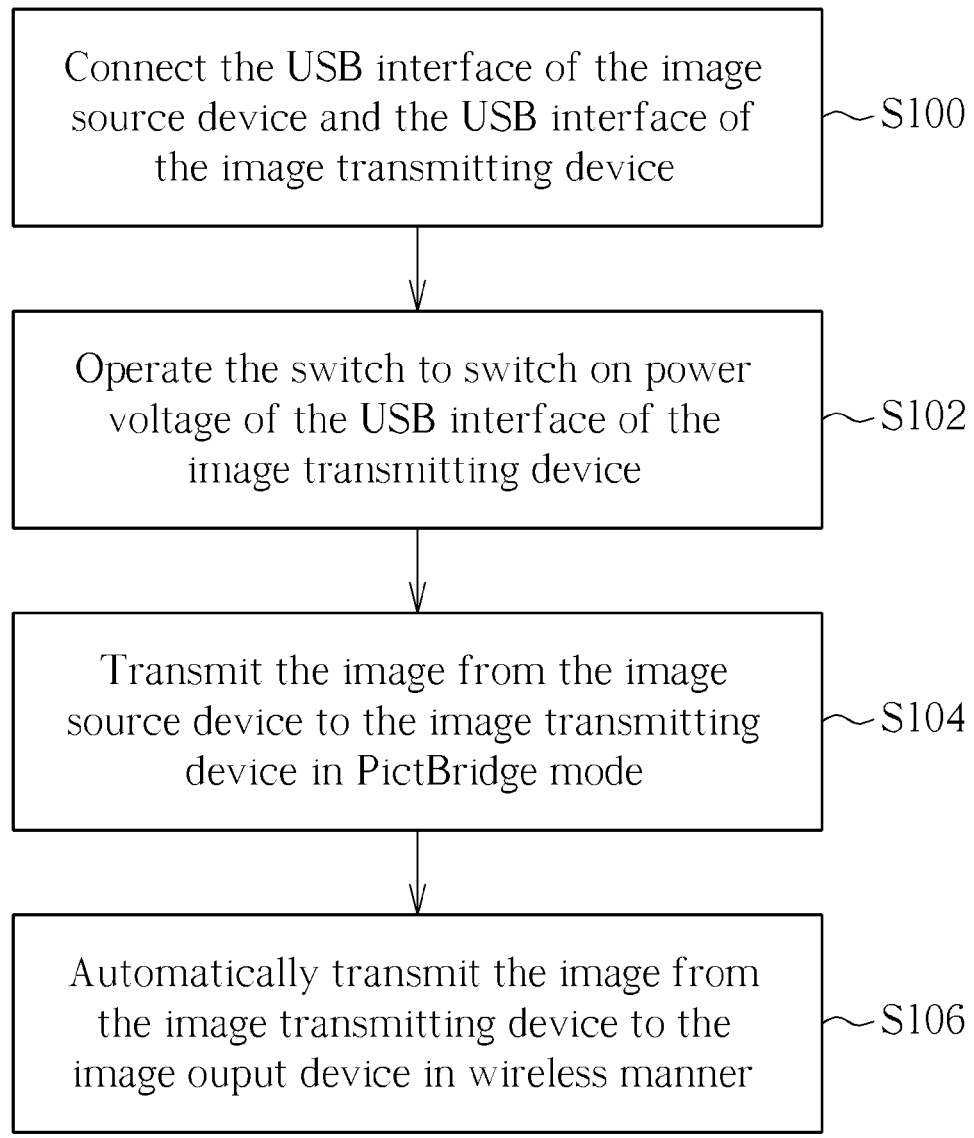
FIG. 4 is a flowchart illustrating a method for transmitting an image according to an embodiment of the invention.

Referring to FIG. 4, FIG. 4 is a flowchart illustrating a method for transmitting an image according to an embodiment of the invention. As shown in FIG. 4 along with FIGS. 1 to 3, the method of the invention utilizes the image transmitting device 12 to transmit an image from the image source device 10 to the image output device 14.

First of all, in step S100, a user has to connect the USB interface 106 of the image source device 10 and the USB interface 124 of the image transmitting device 12 by the cable 16. It should be noted that the communication between the image source device 10 and the image transmitting device 12 does not be established yet before depressing the switch 120. Next, in step S102, if the user wants to transmit the images stored in the memory 104 of the image source device 10 to the image transmitting device 12, he or she has to operate the switch 120 to switch on the USB interface 124 for the image source device 10 to sense the USB interface 106 is powered on so as to establish a PictBridge communication between the image source device 10 and the image transmitting device 12. Then, in step S104, the image can be transmitted from the image source device 10 to the image transmitting device 12 via the USB interfaces 106, 124 in PictBridge mode. Afterward, in step S106, the image is automatically transmitted from the image transmitting device 12 to the image output device 14 in wireless manner via the wireless transmitter 130 and the wireless receiver 144. As mentioned in the above, after transmitting the image, the user has to operate the switch 120 again to switch off the power voltage of the USB interface 124, alternatively, the power voltage of the USB interface 124 can be switched off automatically, such that the image source device 10 senses the USB interface 106 is powered off and is capable of capturing images while the USB interface 106 of the image source device 10 is still connected to the USB interface 124 of the image transmitting device 12 by the cable 16.

Figure 5:
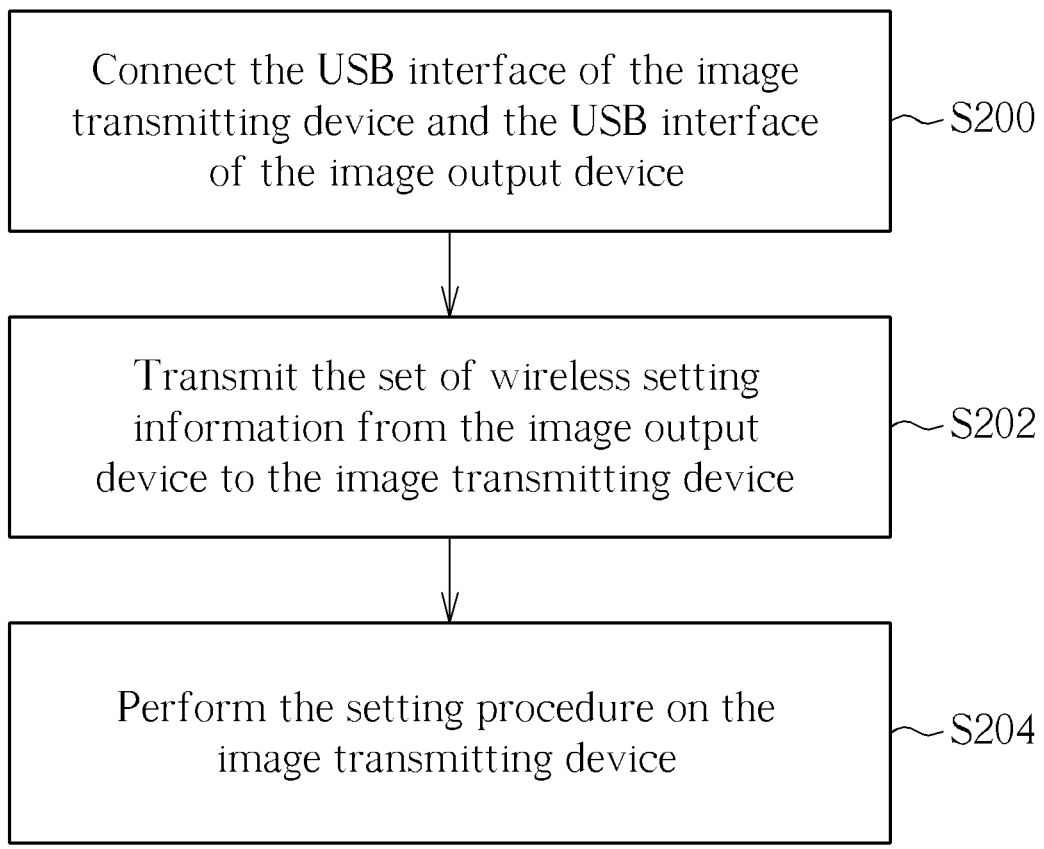
FIG. 5 is a flowchart illustrating a method for establishing wireless communication between the image transmitting device and the image output device according to an embodiment of the invention.

Referring to FIG. 5, FIG. 5 is a flowchart illustrating a method for establishing wireless communication between the image transmitting device 12 and the image output device 14 according to an embodiment of the invention. In step S200, the user has to connect the USB interface 124 of the image transmitting device 12 and the USB interface 148 of the image output device 14 by the cable 16. Then, in step S202, the set of wireless setting information stored in the memory 146 can be automatically or manually transmitted from the image output device 14 to the image transmitting device 12 via the connecting interfaces 124, 148. After receiving the set of wireless setting information, in step S204, the setting procedure can be automatically performed on the image transmitting device 12.

Compared to the prior art, when the user wants to print the images captured by the image source device immediately, he or she just needs to depress the switch of the image transmitting device. The user can utilize the image source device to capture images in photo mode before depressing the switch, and the photo mode will be converted into PictBridge mode while he or she depresses the switch. Furthermore, the user can utilize a cable to connect the image transmitting device and the output device, such that the set of wireless setting information can be automatically transmitted from the image output device to the image transmitting device and then the setting procedure can be automatically performed on the image transmitting device. The user operations therefore become easy.

Those skilled in the art will readily observe that numerous modifications and alterations of the device and method may be made while retaining the teachings of the invention.

What is claimed is:

1. An image transmitting device for transmitting an image from an image source device to an image output device, the image source device comprising a first USB interface and complying with PictBridge protocol, the image output device comprising a wireless receiver, the image transmitting device comprising:
    a second USB interface connected to the first USB interface by a cable;
    an image receiver, electrically connected to the second USB interface, for receiving the image from the image source device by PictBridge protocol via the first and second USB interfaces;
    a first memory for storing the image received by the image receiver;
    a wireless transmitter for communicating with the wireless receiver and for transmitting the image from the first memory to the image output device via the wireless receiver;
    a processor, electrically connected to the image receiver, the memory, and the wireless transmitter, for controlling operations of the image receiver, the memory, and the wireless transmitter; and
    a switch, electrically connected to the second USB interface and the processor, for switching on or off power voltage of the second USB interface such that the image source device enables or disables PictBridge communication between the image transmitting device and the image source device after sensing the second USB interface is powered on or off and for driving the processor to switch on or off the image receiver;
    wherein the power voltage of the second USB interface is switched off for the image source device sensing the second USB interface is powered off to disable PictBridge communication between the image transmitting device and the image source device automatically after the transmitting device receives the wanted image from the image source device, such that the image source device is capable of capturing images while the first USB interface of the image source device is still connected to the second USB interface of the image transmitting device by the cable.

2. The image transmitting device of claim 1, wherein when the switch is operated to switch off the power voltage of the second USB interface such that the image source device disables PictBridge communication between the image transmitting device and the image source device after sensing the second USB interface is powered off, and the image source device is capable of capturing images while the first USB interface of the image source device is still connected to the second USB interface of the image transmitting device by the cable.

3. The image transmitting device of claim 1, wherein when the switch is operated to switch on the power voltage of the second USB interface such that the image source device enables PictBridge communication between the image transmitting device and the image source device after sensing the second USB interface is powered on, and the image source device is incapable of capturing images.

4. The image transmitting device of claim 1, wherein the image output device comprises a third USB interface and a second memory for storing a set of wireless setting information, when the second USB interface is connected to the third USB interface by the cable, the set of wireless setting information is capable of being transmitted from the second memory to the first memory via the second and third USB interfaces.

5. The image transmitting device of claim 1, wherein the wireless receiver and the wireless transmitter comply with WiFi protocol.

6. The image transmitting device of claim 1, wherein the image source device is a digital still camera.

7. The image transmitting device of claim 1, wherein the image output device is a printer.

* * * * *